(12) United States Patent
Hanus

(10) Patent No.: US 8,645,916 B2
(45) Date of Patent: Feb. 4, 2014

(54) CRUNCHING DYNAMICALLY GENERATED SCRIPT FILES

(75) Inventor: Peter J Hanus, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 12/327,617

(22) Filed: Dec. 3, 2008

(65) Prior Publication Data

US 2010/0138477 A1   Jun. 3, 2010

(51) Int. Cl.
G06F 9/44   (2006.01)

(52) U.S. Cl.
USPC ........................... 717/115; 717/118; 717/139

(58) Field of Classification Search
USPC ........................... 717/110–123, 139; 709/203
See application file for complete search history.

(56) References Cited

U.S. PATENT DOCUMENTS

| | | | |
|---|---|---|---|
| 6,078,741 A * | 6/2000 | Ma et al. | 703/24 |
| 6,549,944 B1 * | 4/2003 | Weinberg et al. | 709/224 |
| 6,718,548 B1 | 4/2004 | Hsiao | |
| 6,845,500 B2 * | 1/2005 | Ponticelli et al. | 717/107 |
| 6,990,653 B1 * | 1/2006 | Burd et al. | 717/108 |
| 7,082,478 B2 * | 7/2006 | McCartney et al. | 709/247 |
| 7,484,007 B2 * | 1/2009 | Bannoura et al. | 709/247 |
| 7,500,223 B2 * | 3/2009 | DeSantis | 717/118 |
| 2006/0248166 A1 | 11/2006 | Milosevic et al. | |
| 2007/0273564 A1 | 11/2007 | Morel | |

OTHER PUBLICATIONS

Gregor von Laszewski, G.; Fugang Wang; Younge, A.; Xi He; Zhenhua Guo; Pierce, M.; , "Cyberaide JavaScript: A JavaScript Commodity Grid Kit," Grid Computing Environments Workshop, 2008. GCE '08, pp. 1-10, 12-16, Nov. 2008.*
Divjak, M.; Marolt, M.; , "Flexibility of JavaScript controled simulations," EUROCON'2001, Trends in Communications, International Conference, vol. 2, pp. 404-440, 2001.*
Douglas Crockford; "JSMin The JavaScript Minifier"; Acquired from http://www.crockford.com/javascript/jsmin.html, pp. 1-3, 2003.*
Livshits, Code Splitting for Network Bound Web 2.0 Applications, Microsoft Research Tech Report MSR-TR-2007-101, Aug. 2007, pp. 1-11.*
Pugh; "Compressing Java Class Files," 1999 ACM, pp. 247-258.*
Mahajan, A.V.; Yarra, A.A.; "Techniques for improving Web application performance in bandwidth constrained scenarios," TENCON 2003. Conference on Convergent Technologies for the Asia-Pacific Region, vol. 2, Oct. 2003, pp. 718-722.*
"JavaScript Crunchinator", Retrieved at<<http://www.brainjar.com/js/crunch/>>, Aug. 6, 2008, pp. 1-3.

(Continued)

Primary Examiner — Satish Rampuria
(74) Attorney, Agent, or Firm — Sung Kim; Andrew Sanders; Micky Minhas

(57) ABSTRACT

Various embodiments enable dynamic crunching of script that can be referenced in a webpage. In at least some embodiments, a browser at a client can be employed to navigate to a webpage available from a server. The webpage can be a static webpage or a dynamically generated webpage. In response to a request from the client to the server, the server can be configured to dynamically generate script referenced in a webpage. Dynamic generation of the script at the server can include configuring the script and crunching of the script to reduce its size. The server can communicate a response having the dynamically crunched script to the client to enable execution of the script by the browser.

20 Claims, 5 Drawing Sheets

(56) References Cited

OTHER PUBLICATIONS

"Strong JS", Retrieved at<<http://www.dirfile.com/strong_js.htm>>, Aug. 6, 2008, pp. 1-3.

"Css & Javascript File Compression", Retrieved at<<http://www.hotscripts.com/Detailed/62071.html>>, Aug. 6, 2008, pp. 1-2.

"The JavaScript Minifier", Retrieved at<<http://www.crockford.com/javascript/jsmin.html>>, Dec. 4, 2003, p. 1.

"JavaScript Whitespace Compressor and File Compactor", Retrieved at<<http://www.milonic.com/jscompactor.php>>, Aug. 6, 2008, p. 1.

Martins Galan Daniel, "Pack:Tag", Retrieved at<<http://www.galan.de/files/packtag%20-%20a%20packed%20guide%20to%20website%20performance%20optimization.pdf>>, Apr. 17, 2008, pp. 17.

"ASP Net—Generating a .JS File with Asp.Net", Retrieved at<<http://www.velocityreviews.com/forums/t82239-generating-a-js-file-with-aspnet.html>>, Aug. 6, 2008, pp. 1-5.

"Basics of Server-Side JavaScript", Retrieved at<<http://docs.sun.com/source/816-6411-10/jsserv.htm>>, Aug. 6, 2008, pp. 1-27.

* cited by examiner

CRUNCHING DYNAMICALLY GENERATED SCRIPT FILES

BACKGROUND

Webpages can contain many different types of content that can be useful for a user. A typical webpage can make use of scripting language to provide client-side functionality, such as functions, plug-ins, applets, and so forth. For example, a merchant webpage can be configured with embedded JavaScript code, which is code programmed using a programming language under the trademark JavaScript™, that performs validation of purchase data (e.g., address, zip code, payment info, and so forth) that is input by a consumer via fields in the merchant webpage.

One traditional technique for employing script in a webpage involves statically developing the webpage and the script for the webpage. For example, a human programmer may hand-code both the webpage and the script offline in a development environment. The statically developed webpage and script may then be posted to a web server where they may be accessed and viewed by users. In order to make subsequent modifications to the script, a human programmer using the traditional techniques makes modifications statically and posts updated files to the web server. Such static development of script can be time consuming and costly. Moreover, static development of script can make it difficult or impossible to incorporate dynamic information in the script, such as dynamically configuring the script to reflect user interaction with a corresponding webpage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable dynamic crunching of script that can be referenced in a webpage. In at least some embodiments, a browser at a client can be employed to navigate to a webpage available from a server. The webpage can be a static webpage or a dynamically generated webpage. In response to a request from the client to the server, the server can be configured to dynamically generate script referenced in a webpage. Dynamic generation of the script at the server can include configuring the script and crunching of the script to reduce its size. The server can communicate a response having the dynamically crunched script to the client to enable execution of the script by the browser.

BRIEF DESCRIPTION OF THE DRAWINGS

The same numbers are used throughout the drawings to reference like features.

DETAILED DESCRIPTION

Overview

Figure 1:
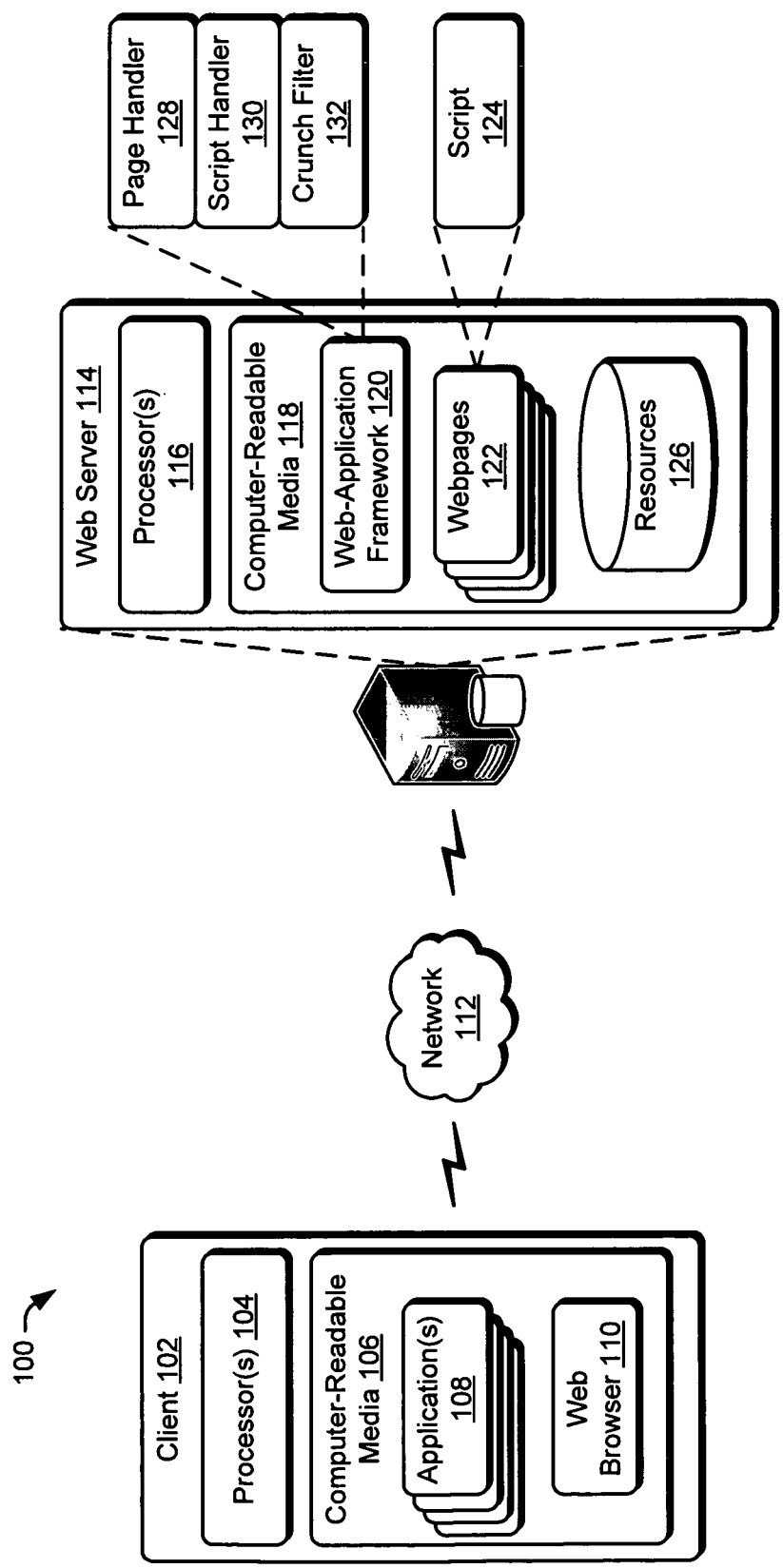
FIG. 1 illustrates an operating environment in accordance with one or more embodiments.

Various embodiments enable dynamic crunching of script that can be referenced in a webpage. In one embodiment, a browser at a client can be employed to navigate to a webpage available from a server. For instance, the browser can form a request for the webpage that is communicated to the server. In response to the request, the server can be configured to retrieve a static webpage or dynamically generate the requested webpage. The webpage can include references to resources including references to script files. When script referenced in the webpage is requested, the script can be dynamically generated and "crunched" at the server to reduce its size.

In order to "crunch" script, the server can implement one or more handlers to process a request and obtain corresponding script. For instance, the script can be dynamically generated at the server in response to the request. The one or more handlers can call or otherwise make use of functionality to "crunch" the dynamically generated script. For example, the server can implement a filter operable to reduce the size of the script by removing blank space, carriage returns, tabs, and other unnecessary characters. Crunching may also include removing comments and/or refactoring of the script to perform the same functions with fewer characters. The smaller-sized script that results may make it faster and more efficient to communicate the script and/or webpages having the script to clients.

The handlers and the filter can be included as components of a web-application framework that may be provided by way of the server. The web-application framework is designed to provide various resources to support dynamic development of web-based content such as websites, web-based applications, web services, and the like. Further, the web-application framework can be configured to detect identifiers associated with different types of client requests and invoke corresponding components to handle the requests. For example, an identifier may be configured as a particular file extension that is associated with requests involving dynamic script crunching. When the particular file extension is included in a resource request from a client, the web-application framework can detect the particular file extension and respond by invoking appropriate components to handle the resource request. For instance, the web-application framework can pass the request to the handlers and/or the filter to cause dynamic generation and/or crunching of script. Then, a response having the "crunched" script can be configured for communication to the client.

In the discussion that follows, a section entitled "Operating Environment" is provided and describes an environment in which one or more embodiments can be employed. After this, a section entitled "Script Crunching Examples" discusses embodiments in which script can be dynamically generated and crunched. A section entitled "Web-Application Framework Examples" follows and describes example frameworks suitable to implement embodiments of dynamic script crunching described herein. Finally, a section entitled "Example System" presents an example system that can be used to implement one or more embodiments.

Operating Environment

FIG. 1 illustrates an operating environment in accordance with one or more embodiments, generally at 100. Environment 100 includes client 102 having one or more processors 104, one or more computer-readable media 106 and one or more applications 108 that reside on the computer-readable media 106 and which are executable by the processor(s) 104.

Applications 108 can include any suitable type of application such as reader applications, e-mail applications, instant messaging applications, and a variety of other applications. The client 102 can be embodied as any suitable computing device such as a desktop computer, a portable computer, a handheld computer such as a personal digital assistant (PDA), cell phone, and the like.

Client 102 also includes a web browser 110. Web browser 110 represents functionality available to a user of the computing device 102 to navigate over a network 112, such as the Internet, to one or more web servers 114 from and to which content can be received and sent. The web browser 110 can operate to output a variety of user interfaces through which the user may interact with content that is available from the one or more web servers 114.

The example web server 114 of FIG. 1 is depicted as having one or more processors 116 and one or more computer-readable media 118. Web server 114 can also be configured to enable or otherwise make use of a web-application framework 120 that operates as described herein. The web-application framework 120 represents a variety of functionality operable to simplify development of code, particularly development of code associated with web-based content. Web-application framework 120 can be configured in a variety of ways, such as being an Active Server Page (ASP) framework, an ASP.net framework, a Java™-based framework, or a PHP-based framework, to name a few. In general, web-application framework 120 is designed to support dynamic development of web-based content such as websites, web-based applications, web services, and the like.

For example, web-application framework 120 can enable dynamic configuration of webpages 122 for communication to the client 102 over the network 112. Webpages 122 can also be static pages posted to the web server 114. The webpages 122 can be configured to include or reference script 124. As used herein, the script 124 represents text-based script configured according to a scripting language. Suitable scripting languages can include European Computer Manufacturer's Association (ECMA) Script, JavaScript, and VBScript to name a few. While crunching of script files is described herein, the techniques can also be applied to generate and crunch other kinds of files, such as those containing Cascading Style Sheets (CSS) and Extensible Markup Language (XML).

To support dynamic development of web-based content, web-application framework 120 can implement or otherwise enable access to a variety of resources 126. The web-application framework 120 makes various types of resources 126 available at runtime to developers of webpages 122, applications, and so forth. The resources 126 may include dynamic link libraries (DLLs), templates, script portions, tools, services, applets, objects, functions, and so forth. The resources 126 can be provided in storage at the web server 114 (e.g., on computer-readable media 118 as illustrated in FIG. 1) and/or via suitable external storage that can be accessed by the web server 114, locally or over the network 112. By providing a set of commonly used resources 126 via the web server 114, the time-consuming and sometimes redundant process of developing web-based content can be made more efficient. For example, developers can call upon the resources 126 at runtime to simplify code that defines a webpage 122 and to reduce the time involved in the development process.

In one embodiment, functionality represented by the web-application framework 120 may be provided by way of various components. These components may include a page handler 128, a script handler 130, and a crunch filter 132. Page handler 128 represents functionality operable to enable dynamic configuration of webpages 122. Likewise, script handler 130 represents functionality operable to enable dynamic configuration of script 124 that can be referenced by webpages 122.

Crunch filter 132 represents functionality operable to "crunch" script 124. Generally, crunching script reduces the file size of the script 124. This reduction in size can enable faster downloading of the script 124, such as by web browser 110. For instance, crunch filter 132 can process script 124 at runtime to remove unnecessary space and characters, such as blanks, tabs, carriage returns, and the like. By doing so, crunch filter can "crunch" the script 124 in a manner that does not substantially alter the functionality of the script 124. In at least some embodiments, script 124 processed via the crunch filter 132 can be script 124 that is dynamically generated via the script handler 130. Additionally or alternatively, crunch filter 132 can operate at runtime to process static script files that have been posted to the web server 114. A variety of techniques to crunch script 124 are contemplated and discussed below.

The computer-readable media 106 and 118 can include all forms of volatile and non-volatile memory and/or storage media that are typically associated with a computing device. Such media can include ROM, RAM, flash memory, hard disk, removable media and the like. One specific example of a computing device is shown and described below in relation to FIG. 5.

Having considered an example operating environment, consider now a discussion of embodiments in which script associated with a webpage can be dynamically crunched.

Script Crunching Examples

In one or more embodiments, techniques may be employed to crunch script 124 that is referenced in a webpage 122. In at least some embodiments, script 124 can be dynamically generated at runtime, such as via the script handler 130 of FIG. 1 or equivalent functionality. Various crunching algorithms are contemplated that can be applied to "crunch" the script 124. One way this can occur is through execution of suitably configured server-side code, such as the example crunch filter 132 of FIG. 1. The "crunched" script can then be communicated in a response for execution at a client 102.

Figure 2:
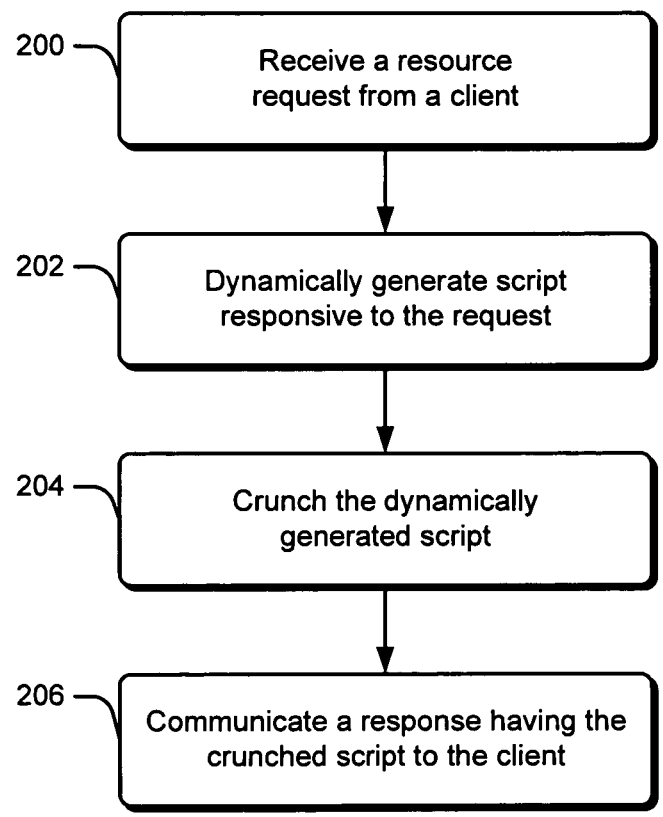
FIG. 2 is a flow diagram that describes steps in a method in accordance with one or more embodiments.

FIG. 2 is a flow diagram that describes a method in accordance with one or more embodiments. The method can be performed in connection with any suitable hardware, software, firmware, or combination thereof. The method is shown as a set of blocks that specify operations performed by one or more entities and are not necessarily limited to the orders shown for performing the operations. In at least some embodiments, the method can be performed by a suitably configured web-application framework, such as the example web-application framework 110 described above with respect to FIG. 1.

Block 200 receives a resource request from a client. This can occur when a web browser 110 of a client 102 navigates to a particular webpage 122 and a reference link to a resource is selected or otherwise invoked. For example, web browser 110 can form a resource request having a uniform resource locator (URL) that is communicated from the client 102 over the network 112 to the web server 114. The request can be configured according to hypertext transfer protocol (HTTP) or any suitable communication protocol to enable resource requests. The URL can be associated with various resources 126 available via the web server 114. Web-application framework 120 can be configured to receive the request and invoke appropriate handlers to process the request.

Block 202 dynamically generates script responsive to the request. For instance, the web-application framework 120 may include or otherwise make use of a script handler to dynamically generate script referenced in a webpage 122. Script handler can process a resource request at the web server 114 to form associated script. The configuration of the script occurs dynamically at the web server 114 in response to the request. In this manner, deficiencies of techniques involving static development of script can be avoided.

Dynamic generation of script 124 can occur whenever processing of a resource request indicates a requested resource calls for dynamically generated script 124. One way this can occur is by including identifiers or other suitable data in the webpage request. In particular, web-application framework 120 can include or otherwise make use of a script handler 130 or other functionality configured to recognize various identifiers in a request. The identifiers enable the web-application framework 120 to understand that handling of the request involves processing of script 124. When these identifiers are detected, script handler 130 can generate the corresponding script 124 and process the script 124.

Block 204 crunches the obtained script. For example, script handler 130 can call, incorporate, or otherwise make use of a crunch filter 132 configured to process script 124. In one embodiment, the crunch filter 132 processes the script 132 to reduce its size by removing unnecessary space and characters such as blanks, tabs, carriage returns, and the like. In other words, the crunch filter 132 "crunches" the script. Rather than crunching the script 124 prior to placing it on the server (e.g., static crunching), the crunch filter 132 enables crunching to occur at runtime in response to a webpage request (e.g., dynamic crunching). For instance, crunch filter 132 can receive script 124 having a certain file size, process the script 124 with one or more algorithms to "crunch" the script 124, and pass the "crunched" script 124 having a smaller file size back to the script handler 130. Block 206 communicates a response having the crunched script to the client. For instance, script handler 130 can call or otherwise make use of a page handler 128 to configure a response to the resource request. The response can be configured to include script 124 that has been "crunched" as just described. The page handler 128 can cause communication of the response over the network 112 to be received by the client 102. The client 102 can receive and execute the script 124 provided in the response.

Figure 3:
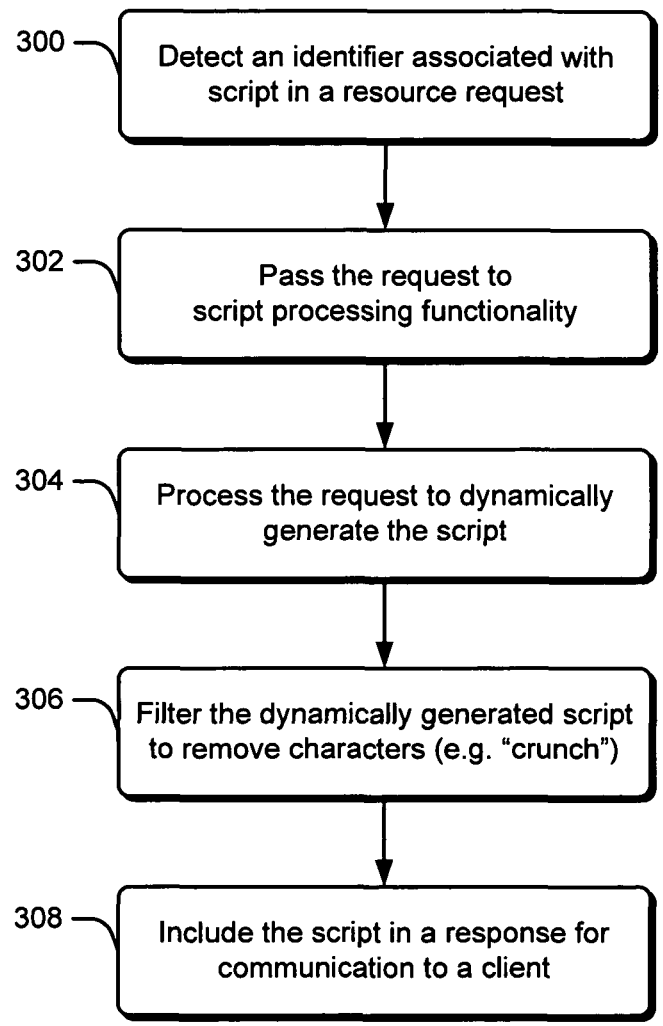
FIG. 3 is a flow diagram that describes steps in a method in accordance with one or more embodiments.

Referring now to FIG. 3, a flow diagram is depicted that describes a method in accordance with one or more embodiments. The method can be performed in connection with any suitable hardware, software, firmware, or combination thereof. The method is shown as a set of blocks that specify operations performed by one or more entities and are not necessarily limited to the orders shown for performing the operations. In at least some embodiments, the method can be performed by a suitably configured web-application framework, such as the web-application framework 120 described above in relation to FIG. 1.

Block 300 detects an identifier associated with script in a resource request. This detection can be performed by a web-application framework 120 in response to receiving a request from a client 102. A variety of suitable identifiers are contemplated, such as HTML tags, metadata, and other suitable identifiers that can be included in the request from the client 102. Web-application framework 120 can be configured to detect various identifiers associated with requested webpages 122, script 124, and/or other resources 126. Based upon the detected identifiers, web-application framework 120 can be configured to differentiate between different types of requests and to handle requests. For example, a request for authentication can be forwarded to an authentication component for processing and a request for a service can be forwarded to a different component that handles service requests.

In at least some embodiments, an identifier can be configured as filename extension that is associated with a requested resource file. A particular extension can be defined that is indicative of script 124 being associated with a request. For example, an arbitrary extension ".ext" can be defined for a file "foo" to indicate that script 124 is associated with the file "foo". Naturally, any suitable extension can be employed. A URL corresponding to a requested resource can include a reference to "foo.ext" that is detectable by the web-application framework 120 to determine that script 124 is associated with the request. When the particular extension ".ext" is detected, web-application framework 120 can handle the request accordingly, such as by causing processing for the associated script 124 to occur.

When an identifier associated with script is detected, block 302 passes the request to a script processing functionality. For example, web-application framework 120 can invoke a script handler 130 to handle a request responsive to detecting the particular extension ".ext" in the foregoing example, or when another suitable identifier is detected. As noted, a script handler 130 can be implemented as a component of the web-application framework 120. Additionally or alternatively, a script handler 130 can be configured as a stand-alone component that is invoked by the web-application framework 120 to perform script processing tasks.

Thereafter, block 304 processes the request to dynamically generate the script. In particular, script handler 130 can make use of resources 126 to dynamically generate the script 124. For instance, script handler 130 can obtain templates, applets, objects, functions, tools, script portions, and other resources 126 to configure the script 124 according to the request.

In an embodiment, script handler 130 can be dedicated to handling and/or generating script 124 in a particular scripting language. For example, web-application framework 120 can include a script handler 130 configured exclusively to handle and/or generate JavaScript. Moreover, multiple different script handlers 130 can be included in the web-application framework 120 to enable processing for different respective scripting languages. Additionally or alternatively, a single script handler 130 can be configured to handle/generate script 124 in accordance with multiple scripting languages. As noted above, a variety of suitable scripting languages are contemplated examples of which include European Computer Manufacturer's Association (ECMA) Script, JavaScript, and VBScript.

When script 124 has been generated, block 306 filters the dynamically generated script to remove characters and block 308 embeds the dynamically generated script into the webpage for communication to a client. As noted above, script handler 130 can call, incorporate, or otherwise make use of a crunch filter 132. The crunch filter 132 represents functionality operable to apply one or more algorithms to "crunch" the script 124 by removing characters and/or spaces. The "crunched" script 124 can then be embedded within a requested webpage 122. For instance, the "crunched" script 124 be passed to a page handler 128 configured to generate a response including the script 124. Page handler 128 can then cause communication of the response having the "crunched" script 124 to a client 102 via a network 112.

Having described example embodiments of dynamic crunching techniques, consider now a discussion of example web-application frameworks in which dynamic script crunching techniques can be employed.

Web-Application Framework Examples

Figure 4:
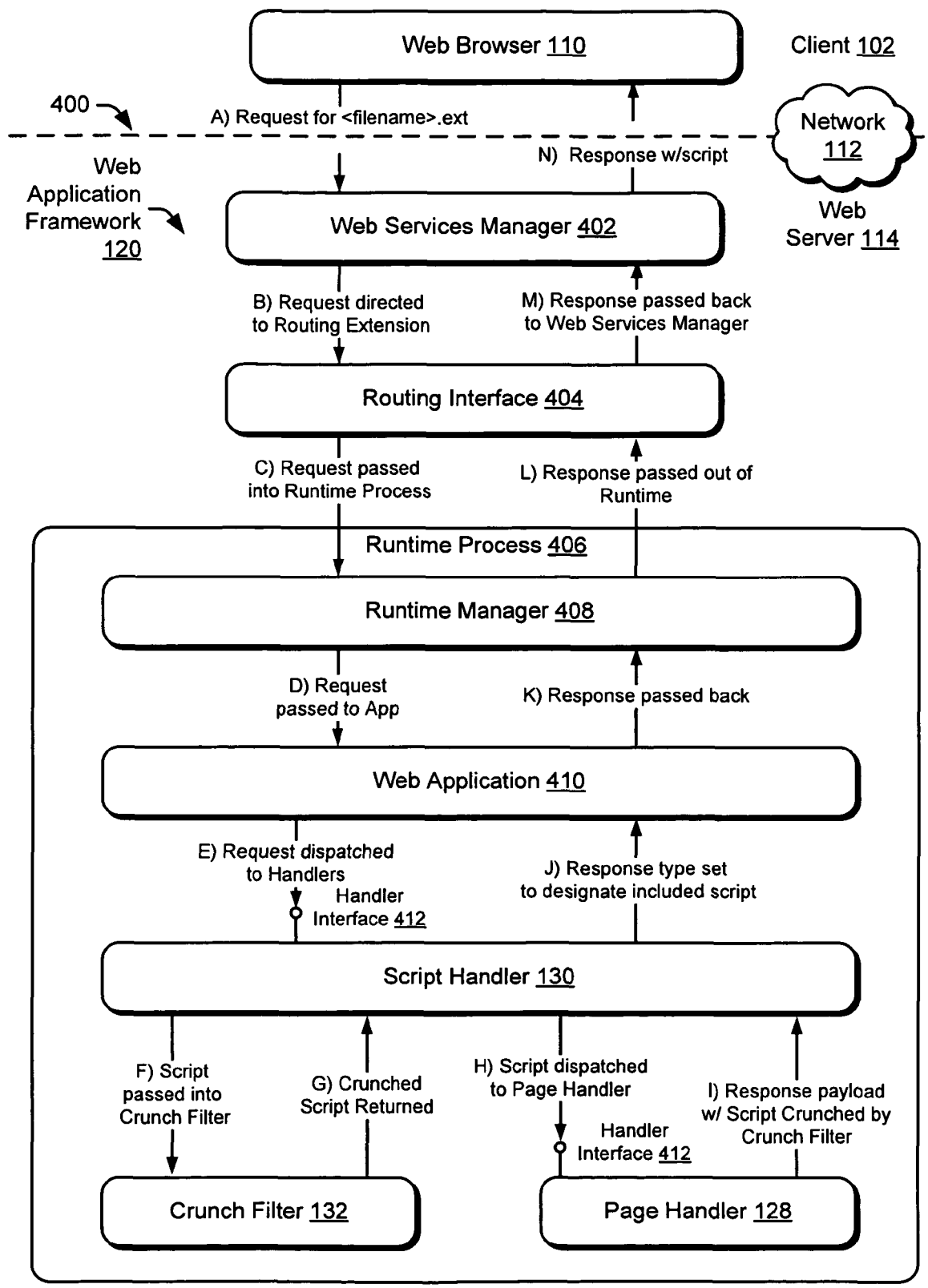
FIG. 4 illustrates a diagram of an example web-application framework in accordance with one or more embodiments.

FIG. 4 illustrates a diagram of an example web-application framework in accordance with one or more embodiments. Portions of the following discussion are described in the context of an ASP.net framework by Microsoft™ that is configured to dynamically crunch JavaScript. A variety of other web-application frameworks and script languages suitable to employ the dynamic script crunching techniques described herein are also contemplated.

FIG. 4 depicts a dashed line 400 that represents a logical division between a client 102 and web server 114, e.g., a division between a client-side and a server-side. An example web-application framework 120 is depicted that can be implemented by way of the web server 114. The web-application framework 120 can provide various web-based content and/or services over a network 112 to the client 102. Client 102 may execute a web browser 110 to interact with the web-application framework 120 to obtain the web-based content and/or services.

The example web-application framework 120 of FIG. 4 includes a variety of sub-components to enable functionality related to provision of web-based content and/or services to clients 102. In particular, web-application framework 120 can include or otherwise make use of a web services manager 402, a routing interface 404, and a runtime process 406. The web service manager 402 is representative of a variety of functionality related to operation of the web server 114. For instance, web service manager 402 can operate to manage server connections, client-server sessions, security, transaction logging, request handling, authentication, bandwidth management, and so forth. Additionally, the web service manager 402 can receive client requests and invoke the appropriate components to handle the requests. Web service manager 402 can handle at least some requests directly, such as handling requests to initiate client-server sessions.

The routing interface 404 represents an interface between the web service manager 402 and various components configured to handle particular types of requests. For instance, routing interface 404 can be configured to differentiate between different types of requests and call corresponding handlers to process the requests. In relation to webpage requests, the routing interface 404 can establish, invoke, or otherwise make use of a corresponding runtime process 406 to process the requests.

The runtime process 406 represents functionality operable to process requests that are passed from the routing interface 404. This processing can include dynamically generating webpages 122, dynamically generating script 124 for the webpages 122, and/or dynamically crunching script 124 as described above and below. The runtime process 406 is further illustrated as including a runtime manager 408 and a web-application 410. The runtime manager 408 represents functionality within the runtime process 408 to manage request processing in a variety of ways. This processing can include managing a pool of resources and/or a request queue, identifying a web-application 410 configured to process a given request, and handing off the requests to web-applications 410.

Web-application 410 represents functionality operable to service requests at the direction of the runtime manager 408. A variety of web-applications can be provided within the runtime process 406 that are each configured to handle particular types of requests. In accordance with techniques described herein, the example web-application 410 of FIG. 4 represents functionality operable to handle requests that involve dynamic generation and/or crunching of script 124. In one embodiment, the runtime process 406 can include or otherwise make use of a script handler 130, crunch filter 132, and/or page handler 128 as described herein.

Consider now a particular example in which the web-application framework 120 is configured as an ASP.net framework. The ASP.net framework for the purposes of this example is configured to dynamically crunch script 124, including at least crunching of JavaScript. In the following discussion, the ASP.net example is described in the context of example acts "A" to "N" depicted in FIG. 4 that can occur in the course of dynamically generating script referenced in a webpage 122.

For example, a web browser 110 of a client 102 can make a resource request for script referenced in a webpage 122. This can occur when a user inputs a URL, clicks on a hyperlink, or otherwise navigates the web browser 110 to obtain resources 126 from the web server 114. Alternatively, a request can be generated automatically by a browser, such as when a webpage is rendered. Act "A" communicates a request from the web browser 110 for a resource generically named "<filename>.ext" in FIG. 4. The request can be configured as a hypertext transfer protocol (HTTP) request. As noted above, an identifier such as an arbitrary extension can be defined to associate a request with script 124. For the ASP.net framework in which JavaScript is dynamically crunched, an extension "asjx" can be employed to denote Active Server JavaScript. Other extensions can be employed with ASP.net to denote other types of resources. For instance, in ASP.net "aspx" can denote webpages, "asmx" can denote web services, and "ashx" can denote web-applications. The "asjx" filename extension, or another suitable extension, can be employed to extend ASP.net to associate the file extension with files that dynamically generate JavaScript.

The web-application framework 120 and in particular the web service manager 402 receives the request. The web service manager 402 can utilize an identifier in the request (e.g., the "asjx" extension) to recognize the type of request and invoke appropriate components to process the request. One example of a suitable web service manager 402 is Internet Information Service (IIS) Web Server by Microsoft™.

Act "B" routes the request to the routing interface 404. In this example, routing interface 404 is configured to handle particular types of request. For instance, routing interface 404 can be configured as an HTTP routing interface to handle requests that are HTTP requests. Other types of requests (e.g., authentication requests, image requests, and so forth) can be handled directly by the web service manager 402 or by a different interface. In the continuing ASP.net example, routing interface 404 can be configured to handle requests for ASP.net resources. In this example, the functionality represented by routing extension 404 can be provided by way of an ASP.net ISAPI (Internet Server Application Programming Interface) extension. The ASP.net ISAPI extension provides an interface between the IIS Web Server and ASP.net processes that handle requests for ASP.net resources. In this example, the example "asjx" request can be passed to the ASP.net ISAPI extension. ASP.net ISAPI extension can be configured to recognize the "asjx" extension and invoke corresponding resources to process the request.

In order for the "asjx" extension to be recognized, the IIS Web Server can be configured to map the "asjx" file extension to the ASP.net ISAPI extension. This causes requests made to the IIS Web Server for a resource having the "asjx" extension to be handed off to the ASP.net ISAPI extension for further processing. It is once again noted that the choice of a file extension is arbitrary. For instance, any suitable extension that is not already mapped by IIS Web Server can be mapped.

In general, a routing interface 404 can operate to determine that a request involves script 124 based on a filename extension or other identifier. In Act "C" routing interface 404 passes the request to a runtime process 406 configured to service the request. A runtime manager 408 within the runtime process 406 can receive the request and allocate appropriate components/resources for processing the request. For instance, in Act "D" runtime manager 408 invokes a corresponding web-application 410 to process the request.

Continuing the foregoing ASP.net example, the runtime process 406 can be an ASP.net runtime process and the functionality represented by the runtime manager 408 can be provided by way an HTTP runtime module in ASP.net. The HTTP runtime module in ASP.net can manage a variety of HTTP related requests that are passed into the runtime by the ASP.net ISAPI extension. HTTP related requests can include service requests, webpage requests, and requests that are associated with JavaScript, to name a few. When a request is handed off to ASP.net ISAPI extension, the ASP.net ISAPI extension in turn passes the request into the ASP.Net runtime. ASP.Net runtime can be configured to handle requests for "aspx" files using the page handler 128, script handler 130, and crunch filter 132 described herein.

As noted above, different extensions can be associated with different types of requests. HTTP runtime module can make use of the different extensions to handle each type of request differently. A variety of web-applications 410 can be included in the ASP.net runtime process to enable handling of different respective requests. A web-application 410 invoked to handle the example "asjx" request can be configured as an HTTP application within the ASP.net framework.

In act "E", web-application 410 dispatches the request for servicing by one or more handlers. One way this can occur is through a page handler 128, script handler 130, and/or a crunch filter 132 as described herein. For instance, script handler 130 can dynamically generate script 124 based on a request. Additionally or alternatively, script handler 130 can obtain static script from a storage location referenced by the request. Act "F" passes the script 124 for processing by the crunch filter 132.

Returning again to the ASP.net example, the example "asjx" request can be dispatched to the script handler 130. Script handler 130 dynamically generates JavaScript in an "asjx" file based upon the request. Script handler 130 can invoke the crunch filter 132 and pass in the dynamically generated JavaScript in the "asjx" file for processing by the crunch filter 132. Note that communications between the web-application 410 and between various handlers can occur by way of a handler interface 412 as depicted in FIG. 4. One example of a handler interface 412 is IHTTPhandler interface in the ASP.net framework.

A script handler 130 can be implemented in ASP.net as a class that is derived from a .Net Framework System.Web.PageHandlerFactory. Using this class, the script handler 130 can be configured as an IHTTPhandler that makes use of the IHTTPhandler interface and built-in functions available via the IHTTPhandler interface. This can also enable interactions with a suitably configured page handler 128 to compile the JavaScript in the "asjx" file that is output by the script handler 130. The "asjx" file can be compiled in a manner similar to the way in which the page handler 128 compiles other types of files, such as "aspx" files that are related to other types of webpages 122.

Following is an example of code suitable to implement an example script handler 130 named "ActiveJSHandler" in the ASP.net framework to enable handling of JavaScript:

```
public class ActiveJSHandler: PageHandlerFactory, IHttpHandler
{
#region IHttpHandler Members
public ActiveJSHandler( ): base( ) { }
public bool IsReusable
{
get { return true; }
}
public void ProcessRequest(HttpContext context)
{
context.Response.Filter = new
CrunchStream(context.Response.Filter);
IHttpHandler handler = base.GetHandler(context,
context.Request.HttpMethod, context.Request.Path,
context.Server.MapPath(context.Request.Path));
handler.ProcessRequest(context);
context.Response.ContentType = "application/x-javascript";
}
#endregion
}
```

As noted above, IIS Web Server can be configured to map the "asjx" file extension to the ASP.net ISAPI extension. This enables recognition of requests for JavaScript resources in the ASP.net implementation. In order to have "asjx" files compiled in a manner similar to "aspx" files, a build provider used to process "aspx" pages can also be mapped to the "asjx" extension. For example, "asjx" can be mapped to the appropriate build provider in a configuration file for the machine and/or in a configuration file for a particular web-application 410. One example of code suitable to implement this mapping in ASP.net is as follows:

```
<compilation>
    <buildProviders>
        <add extension=".asjx"
type="System.Web.Compilation.PageBuildProvider"/>
    </buildProviders>
</compilation>
```

In addition, the script handler 130 can also be mapped to the "asjx" file extension. One example of code suitable to implement mapping of the preceding example "ActiveJSHandler" to the "asjx" extension in ASP.net is as follows:

```
<httpHandlers>
    <add verb="*" path="*.asjx"
type="Microsoft.Live.Safety.ActiveJSHandler,
Microsoft.Live.Safety" validate="false"/>
</httpHandlers>
```

When JavaScript obtained via the script handler 130 is passed to the crunch filter 132, the crunch filter 132 applies one or more algorithms to crunch the JavaScript. Any suitable algorithm can be employed. One example of code suitable to implement a crunch filter 132 to apply one or more algorithms to crunch JavaScript in ASP.net is as follows:

```
public class CrunchStream: Stream
{
    private static ScriptCruncher s_cruncher = new
ScriptCruncher( );
    private Stream _baseStream;
    private string _stringBuffer = string.Empty;
    public CrunchStream(Stream baseStream)
```

-continued

```
{
    this.__baseStream = baseStream;
}
public override void Write(byte[ ] buffer, int offset, int count)
{
    __stringBuffer +=
    System.Text.Encoding.UTF8.GetString(buffer);
    string jscript = s_cruncher.Crunch(__stringBuffer);
    //if jscript is 0, either nothing to write or we don't have
    full buffer
    if (0 < jscript.Length)
    {
      byte[ ] newBuffer =
      System.Text.Encoding.UTF8.GetBytes(jscript);
      this.__baseStream.Write(newBuffer, 0,
      newBuffer.Length);
    }
  }
}
```

In act "G" the "crunched" script is returned to the script handler 130. In act "H" the script handler 130 passes the request to the page handler 128 for processing. Page handler 128 can operate to include the "crunched" script in a response to the resource request. As noted, page handler 128 can be invoked to configure a response that includes the dynamically generated script. Page handler 128 can configured a response before, concurrently with, or after operations to dynamically crunch the script 124. Further, page handler 128 can operate to compile the script 124 and associated code to create a response payload.

Act "I" passes the response payload having the crunched script back to the script handler 130. In act "J", script handler 130 sets a response type to designate that the response payload includes the crunched script and passes the response to the web-application 410. Acts "K" to "M" involve passing the configured response back along the components of the web-application framework 120. In particular, the response payload having the crunched script can be passed successively to the runtime manager 408 (Act "K"), out of the runtime process 406 to the routing interface 404 (Act "L"), and from the routing interface 404 back to the web services manager 402 (Act "M").

In Act "N" the response payload having the crunched script is communicated over the network to the web browser 110. For example, the web services manager 402 can communicate an HTTP response that includes JavaScript that has been crunched as previously discussed. Web browser 110 can receive the HTTP response and cause execution of the Java-Script (or other script 124) in the response.

Having described various embodiments in which a web-application framework can be configured to employ dynamic script-crunching techniques, consider now a discussion of an example system that can be utilized to implement the embodiments described above.

Example System

Figure 5:
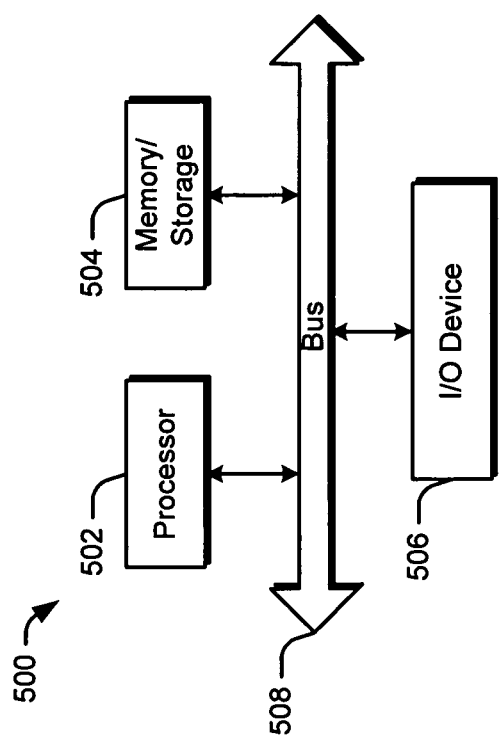
FIG. 5 is a block diagram of a system in accordance with one or more embodiments.

FIG. 5 illustrates an example computing device 500 that can implement the various embodiments described above. Computing device 500 can be, for example, computing device 102 and/or web server 114 of FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer-readable media can be any available medium or media that can be accessed by a computing device. By way of example, and not limitation, computer-readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments to enable dynamic crunching of script that can be embedded in a webpages have been described herein. Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computer-implemented method comprising:
receiving a request for a resource at a server from a client;
dynamically generating script at the server, responsive to the request;
responsive to dynamically generating the script, passing the dynamically generated script to a crunch filter that is included as a component of a particular web application framework at the server and configured to crunch the dynamically generated script at runtime by applying a crunching algorithm to reduce a size of the dynamically generated script in a manner that does not substantially alter functionality of the dynamically generated script, the web application framework configured to detect filename extensions associated with different types of received requests from the client and invoke corresponding components to crunch the dynamically generated script;

receiving crunched script from the crunch filter; and responsive to receiving the crunched script, communicating a response having the crunched script to be received by the client, the response having an identifier to indicate that the response includes dynamically generated crunched script that is associated with the particular web application framework.

2. The computer-implemented method of claim 1, further comprising communicating a webpage to the client having a reference to the script operable to cause communication of the request to be received by the server.

3. The computer-implemented method of claim 2, wherein dynamically generating the script comprises configuring a script file at the server using one or more resources available via the server.

4. The computer-implemented method of claim 1, wherein the dynamically generating the script includes determining a storage location having the script and retrieving the script from the storage location to perform the crunching.

5. The computer-implemented method of claim 1, wherein the script is configured as JavaScript code.

6. The computer-implemented method of claim 1, wherein the dynamically generating is performed responsive to detecting a filename extension that is associated with the request.

7. The computer-implemented method of claim 1, further comprising configuring the response to include the crunched script.

8. The computer-implemented method of claim 1, wherein the crunching algorithm reduces the size of the script by removing characters and spaces that do not substantially alter functionality of the script.

9. A computer-implemented method comprising:
dynamically generating script for a webpage responsive to detecting an identifier associated with the script in a resource request received from a client, the identifier detectable by a particular web application framework to distinguish between different types of received requests and invoke corresponding components to process the requests;

responsive to dynamically generating the script, passing the dynamically generated script to crunch filter that is included as a component of the particular web application framework at the server and configured to reduce a size of the script in a manner that does not substantially alter functionality of the dynamically generated script;

receiving dynamically generated filtered script from the crunch filter; and responsive to receiving the dynamically generated filtered script, configuring a response to the resource request to include the dynamically generated filtered script for communication to the client, the response having the identifier to indicate that the response includes the dynamically generated filtered script which is associated with the particular web application framework.

10. The computer-implemented method of claim 9, further comprising:
dynamically generating the webpage to have a reference to the script; and
communicating the webpage to the client to enable configuration of the resource request based on the reference.

11. The computer-implemented method of claim 10, wherein the reference to the script is a filename that incorporates the identifier.

12. The computer-implemented method of claim 9, wherein the request is a hypertext transfer protocol (HTTP) request designating a uniform resource locator (URL) and the identifier is a file extension included in the URL.

13. The computer-implemented method of claim 9, wherein the identifier is configured to indicate that the script is JavaScript code.

14. The computer-implemented method of claim 9, wherein the crunch filter is configured to filter the dynamically generated script by applying a crunching algorithm to remove unnecessary spaces and characters in the dynamically generated script.

15. The computer-implemented method of claim 9, wherein the crunch filter is configured to apply one or more crunching algorithms to the dynamically generated script.

16. A system comprising:
one or more processors;
one or more computer-readable memory device storing one or more modules executable via the one or more processors to implement a web-application framework configured to:
detect filename extensions associated with different types of received requests from clients and invoke corresponding components to process the requests;
dynamically generate JavaScript code according to a Hypertext Transfer Protocol (HTTP) request received from a client browser that includes a filename extension associated with JavaScript code, the filename extension being employable to denote Active Server JavaScript;
responsive to dynamic generation of the JavaScript code, filter the dynamically generated JavaScript code to reduce a size of the dynamically generated JavaScript code by invoking a crunch filter that corresponds to the filename extension to reduce the size in a manner that does not substantially alter functionality of the dynamically generated JavaScript code;
generate a response to the HTTP request; and
include the filtered JavaScript code in the response for communication to the client browser.

17. The system of claim 16, wherein the web-application framework is configured as an Active Server Page (ASP) framework.

18. The system of claim 16, wherein the web-application framework is further configured to:
receive the HTTP request over a network from the client browser;
detect the filename extension associated with JavaScript code in the HTTP request; and
invoke functionality operable to perform the dynamic generation of the JavaScript code responsive to detecting the file name extension.

19. The system of claim 16, wherein the crunch filter is configured to filter the dynamically generated JavaScript code by applying one or more algorithms to remove blank space and characters.

20. The system of claim 16, wherein the web-application framework is further configured to:
dynamically generate a webpage operable via the client browser to form the HTTP request;
communicate the webpage to the client browser; and
receive the HTTP request from the client browser to cause dynamic generation of the JavaScript code.

* * * * *